United States Patent
Darling

(10) Patent No.: US 10,800,705 B1
(45) Date of Patent: Oct. 13, 2020

(54) COMPOSITION HAVING PLASMA-TREATED RECYCLED STEEL FIBERS

(71) Applicant: Douglas Darling, Culpepper, VA (US)

(72) Inventor: Douglas Darling, Culpepper, VA (US)

(73) Assignee: Integrated Composite Construction Systems, LLC, Manassas, VA (US)

( * ) Notice: Subject to any disclaimer, the term of this patent is extended or adjusted under 35 U.S.C. 154(b) by 0 days.

(21) Appl. No.: 16/869,589

(22) Filed: May 7, 2020

Related U.S. Application Data

(60) Provisional application No. 62/815,281, filed on Mar. 7, 2019.

(51) Int. Cl.

| | |
|---|---|
| *C04B 28/00* | (2006.01) |
| *C04B 28/04* | (2006.01) |
| *C04B 14/04* | (2006.01) |
| *C04B 14/48* | (2006.01) |
| *C04B 20/10* | (2006.01) |
| *C04B 24/26* | (2006.01) |
| *C04B 40/00* | (2006.01) |
| *E01F 15/08* | (2006.01) |
| *E01F 13/00* | (2006.01) |
| *C04B 18/14* | (2006.01) |
| *B28B 1/14* | (2006.01) |
| *C04B 103/30* | (2006.01) |
| *C04B 111/20* | (2006.01) |
| *C04B 111/00* | (2006.01) |
| *B28B 1/29* | (2006.01) |
| *B28B 3/20* | (2006.01) |

(52) U.S. Cl.
CPC .............. *C04B 28/04* (2013.01); *C04B 14/04* (2013.01); *C04B 14/48* (2013.01); *C04B 18/146* (2013.01); *C04B 20/1055* (2013.01); *C04B 20/1059* (2013.01); *C04B 24/2641* (2013.01); *C04B 40/0046* (2013.01); *E01F 13/00* (2013.01); *E01F 15/083* (2013.01); *B28B 1/14* (2013.01); *B28B 1/29* (2013.01); *B28B 3/20* (2013.01); *C04B 2103/302* (2013.01); *C04B 2111/0075* (2013.01); *C04B 2111/2046* (2013.01)

(58) Field of Classification Search
CPC ..... C04B 14/04; C04B 14/48; C04B 20/1055; C04B 20/1059; C04B 28/04; C04B 40/0046; C04B 2103/302; C04B 2111/0075; C04B 2111/2046; E01F 13/00; E01F 15/083; B28B 1/29; B28B 3/20
USPC .................................... 404/6–9, 72
See application file for complete search history.

(56) References Cited

U.S. PATENT DOCUMENTS

| | | | | |
|---|---|---|---|---|
| 5,869,140 A | * | 2/1999 | Blohowiak | ............. C23C 18/04 427/307 |
| 6,929,865 B2 | * | 8/2005 | Myrick | ................... C04B 20/12 106/644 |
| 8,016,938 B2 | | 9/2011 | Durst et al. | ............... C04B 7/02 106/644 |
| 8,137,826 B2 | * | 3/2012 | Louchet-Pouillerie | ...................... C04B 41/89 428/701 |
| 2007/0228612 A1 | | 10/2007 | Durst et al. | ............... C04B 7/00 264/333 |

\* cited by examiner

*Primary Examiner* — Raymond W Addie
(74) *Attorney, Agent, or Firm* — Juneau & Mitchell IP Law Firm; Todd L. Juneau

(57) ABSTRACT

The invention relates to a composition having plasma-treated recycled steel fibers within the matrix.

8 Claims, 1 Drawing Sheet

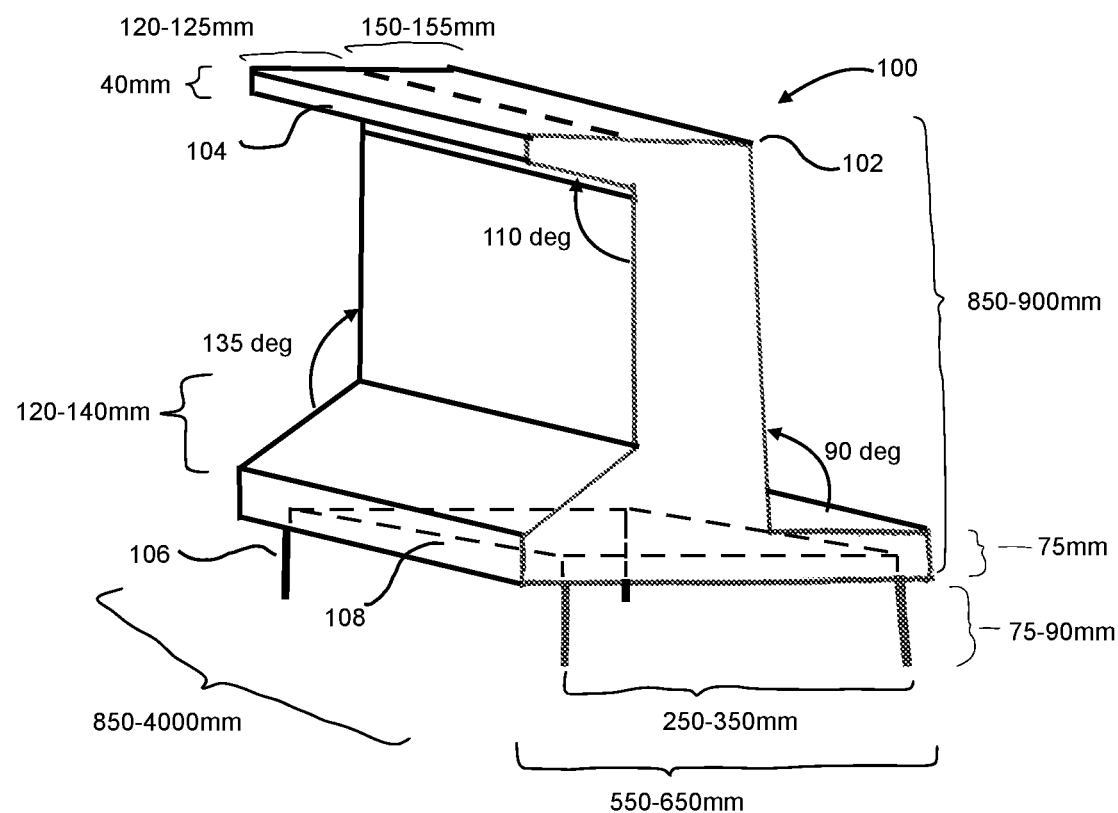

COMPOSITION HAVING PLASMA-TREATED RECYCLED STEEL FIBERS

CROSS-REFERENCE TO RELATED APPLICATIONS

Provided by Application Data Sheet per USPTO rules.

STATEMENT REGARDING FEDERALLY SPONSORED R&D

Provided by Application Data Sheet per with USPTO rules.

NAMES OF PARTIES TO JOINT RESEARCH AGREEMENT

Provided by Application Data Sheet per with USPTO rules.

REFERENCE TO SEQUENCE LISTING

Provided by Application Data Sheet per USPTO rules.

STATEMENT RE PRIOR DISCLOSURES

Provided by Application Data Sheet per USPTO rules.

BACKGROUND OF THE INVENTION

Field of the Invention

The invention relates to a composition having plasma-treated recycled steel fibers within the matrix.

Description of the Related Art

Durable construction materials come in many forms. However, there is still a need for improved compositions having properties desirable in construction projects.

SUMMARY

Accordingly, in one preferred embodiment, the invention provides a composition, comprising:
first constituents, comprising:
cement of Blaine fineness of about 280 to about 360 m2/kg;
sand, wherein said sand is provided at a mass ratio of about 0.75 to about 1.25 of said cement;
silica fume, wherein said silica fume is provided at a mass ratio of about 0.15 to about 0.4 of said cement;
silica flour, wherein said silica flour is provided at a mass ratio of about 0.15 to about 0.3 of said cement;
microinclusions, wherein said microinclusions are provided at a mass ratio of up to about 0.35 of said cement, and wherein said first constituents are mixed to yield a first homogeneous mix;
second constituents comprising:
at least one high-range water-reducing admixture; and
water, wherein said water is provided at a mass ratio of about 0.2 to about 0.35 of said cement, and
wherein said high-range water-reducing admixture and said water are blended into a second homogeneous mix prior to mixing said second homogenous mix with said first homogeneous mix to form a uniform cement-containing paste; and
macrofibers consisting of plasma treated recycled steel fibers,
wherein the macrofibers are cleaned by plasma treatment to remove organic contamination, remove surface oxides, increase surface hydrophilic property, and improve adhesion, wherein the plasma treatment is selected from the group consisting of: Argon plasma micro-sandblasting, Hydrogen plasma treatment for removal of surface oxides on the recycled steel fibers, Helium plasma treatment, Nitrogen plasma treatment, and Oxygen plasma treatment;
wherein the macrofibers are surface-modified by plasma treatment using plasma enhanced chemical vapor deposition to coat the macrofibers with one or more layers selected from the group consisting of: carbon, silicon, carbon nanotubes, silicon carbide, silicon nitride, and mixtures thereof;
wherein the macrofibers are surface energy modified by plasma treatment to have one or more ultra-thin layers of a film that adjusts wetting properties to improve of the wettability and increase the mixability of the macrofibers in the composition;
wherein said macrofibers are provided at a mass ratio of up to about 0.35 of said cement, and wherein said macrofibers are blended into said uniform cement-containing paste such that said macrofibers are distributed approximately uniformly in a resultant cement-containing paste, and wherein said resultant cement-containing paste is hydrated.

In another preferred embodiment, the invention provides a composition as described and claimed further comprising nanoinclusions, wherein said nanoinclusions are mixed with said first constituents to yield said first homogeneous mix.

In another preferred embodiment, the invention provides a composition as described and claimed wherein said material for formation of said microinclusions are selected from the group consisting of: metals, alloys, steel, synthetics, polymers, natural inorganics, minerals, glass, asbestos, carbon, cellulose, synthetic organics, natural organics, sisal, and combinations thereof.

In another preferred embodiment, the invention provides a composition as described and claimed wherein said cement is portland cement with a calcium to silica ratio of less than about 3.1.

In another preferred embodiment, the invention provides a composition as described and claimed wherein said silica fume is at least 96% silica with a maximum carbon content of less than about 4%.

In another preferred embodiment, the invention provides a composition as described and claimed wherein said silica flour is crushed silica of less than about 40 microns in its longest dimension.

In another preferred embodiment, the invention provides a composition as described and claimed wherein said macrofibers are of lengths between about 18 to about 38 mm and in diameters between about 0.38 to about 0.63 mm.

In another preferred embodiment, the invention provides a composition as described and claimed wherein said macrofibers incorporate ends selected from the group consisting of: hooked ends, approximately straight ends, bulbed ends, and combinations thereof.

In another preferred embodiment, the invention provides a composition as described and claimed wherein said macrofibers have a surface selected from the group consisting of: silica fume bonded to said surface, glass frit bonded to said surface, a roughened surface, and combinations thereof.

In another preferred embodiment, the invention provides a composition as described and claimed further comprising mats of steel strands of diameter less than about 2.5 mm affixed to a tensile-load carrying face of said structure.

In another preferred embodiment, the invention provides a composition as described and claimed wherein said high-range water-reducing admixture comprises polycarboxylates, wherein said amount is in the range of about three to about 20 fluid ounces per 100 lb of said resultant cement-containing paste.

In another preferred embodiment, the invention provides a composition as described and claimed wherein said microinclusions are selected from the group consisting of: fiber microinclusions, spherical microinclusions, polyhedron microinclusions, and combinations thereof.

In another preferred embodiment, the invention provides a composition as described and claimed wherein said microinclusions have a longest dimension from about one micron to about 150 microns.

In another preferred embodiment, the invention provides a composition as described and claimed wherein nanoinclusions are included in said first constituents to yield said first homogeneous mix.

In another preferred embodiment, the invention provides a composition as described and claimed wherein said nanoinclusions are selected from the group consisting of: fiber nanoinclusions, spherical nanoinclusions, polyhedron nanoinclusions, and combinations thereof.

In another preferred embodiment, the invention provides a composition as described and claimed wherein materials from which said nanoinclusions are fabricated are selected from the group consisting of: carbon nanotubes, colloids, colloidal silica, and combinations thereof.

In another preferred embodiment, the invention provides a composition as described and claimed wherein materials from which said microinclusions are fabricated are selected from the group consisting of: metals, ceramics, organics, natural inorganics, natural minerals, synthetics, and combinations thereof.

In another preferred embodiment, the invention provides a composition as described and claimed wherein configurations of said microinclusion materials are selected from the group consisting of: steel shavings, ceramic whiskers, ceramic spheres, mineral fibers, wollastonite, carbon fibers and combinations thereof.

In another preferred embodiment, the invention provides a composition as described and claimed wherein said cement-containing paste is a stiff dough with approximately zero slump.

In another preferred embodiment, the invention provides a composition as described and claimed wherein said cement-containing paste is a flowable mixture.

In another preferred embodiment, the invention provides a composition as described and claimed wherein said components are selected from the group consisting of: plates, channels, pipes, tubes, I-sections, WF-sections, connectors, panels, and combinations thereof.

In another preferred embodiment, the invention provides a composition as described and claimed wherein said components are employed to fabricate items selected from the group consisting of: vehicle up-armoring, ballistic armor, blast-resistant panels, man-portable panels, thin armor panels, forced entry resistant structural elements, roofing tiles, wall panels, floor tiles, hurricane and tornado resistant structural elements, and combinations thereof.

In another preferred embodiment, the invention provides a method of producing a composition component of a structure, said structure having a combination of strength and toughness suitable to resist blast and to resist penetration by ballistic fragments, comprising:

mixing first constituents comprising:
cement of Blaine fineness of about 280 to about 360 m2/kg;
sand, wherein said sand is provided at a mass ratio of about 0.75 to about 1.25 of said cement;
silica fume, wherein said silica fume is provided at a mass ratio of about 0.15 to about 0.4 of said cement;
silica flour, wherein said silica flour is provided at a mass ratio of about 0.15 to about 0.3 of said cement;
microinclusions, wherein said microinclusions are provided at a mass ratio of up to about 0.35 of said cement, and
wherein said mixing results in a first homogeneous mix;
mixing second constituents comprising:
at least one high-range water-reducing admixture; and
water, wherein said water is provided at a mass ratio of about 0.2 to about 0.35 of said cement, and
wherein said mixing of said second constituents results in a second homogenous mix;
mixing said first homogeneous mix with said second homogeneous mix to form a uniform cement-containing paste;
blending macrofibers into said uniform cement-containing paste such that said macrofibers are distributed approximately uniformly in a resultant cement-containing paste;
forming said resultant cement-containing paste in the shape of said component, and
hydrating said formed resultant cement-containing paste.

In another preferred embodiment, the invention provides a method as described and claimed wherein said forming is done by techniques selected from the group consisting of: spin casting, extrusion molding, pressure molding, pouring into forms, and combinations thereof.

In another preferred embodiment, the invention provides a method as described and claimed wherein said composition component is cured by:
placing in an environment of approximately 100% relative humidity for about seven days at ambient temperature,
submersing in water of approximately 85° C. to about 91° C. for about three to about five days, and
heating in air at approximately 85° C. to about 91° C. for about one to about two days,
wherein, said cured composition component becomes crystalline unlike said composition components cured under ambient conditions as an amorphous calcium silicate hydrate.

In another preferred embodiment of the invention, there is provided a jersey barrier, comprising:
a form made using the composition of claim 1,
wherein the dimensions of the form comprise a height of 850-900 mm with a 40 mm wide lip overhanging 120-125 mm on a street side, said lip joins a trunk section at a 110 degree angle, and a top surface and bottom surface of the form are flat, and parallel to one another, said top surface having an width of 270-280 mm, with said lip comprising 120-125 mm and a top remaining section of the trunk comprising 150-155 mm, said form having a footer 75-90 mm thick, said footer on one side meets the trunk at a 90 degree angle, and on the street side the footer meets the trunk at on offset angle of 135 degrees by having a sloped portion that is 120-140 mm in height, said form having a length from 850-4000 mm, and said form having a plurality of steel rebars forming a matrix that is disposed within an interior of the form, said matrix connected to rebar mounting posts extending from the bottom surface of the footer, said rebar mounting posts extend 75-90 mm beyond the bottom surface of the form, said form having a plurality of tensioning cables disposed within the interior of the form, said tensioning cables comprising heat cured cables cured to 40,000 psi.

BRIEF DESCRIPTION OF FIGURES

FIG. 1 is an illustration of a modified jersey barrier made using the compositions of the present invention.

DETAILED DESCRIPTION

Plasma Treatment

Plasma treatment is a surface modification technique that readily primes any surface for better acceptance of secondary manufacturing applications. Plasma is a reactive treatment process where positive and negative ions, electrons, and radicals react and collide as long as an electric potential difference exists. Some plasma treatments use low pressure, or vacuum plasma, for more consistent and longer-lasting surface treatments. By plasma treating recycled steel fibers, the invention provides microscopically changed surfaces for improved bonding, micro-cleaned fibers to enhance the surface wetting of adhesives or over-molded elastomers, functionalized groups (carbonyl, hydroxyl and others) to improve surface energy, and the establishment of hydrophobic and hydrophilic properties.

Plasma Cleaning

Plasma cleaned steel fibers avoids the use of environmentally unfriendly cleaning chemicals in addition to e.g. trichloroethylene. Plasma cleaning offers significant advantages over wet cleaning methods alone and removes organic contamination, renders surfaces more hydrophilic, and improves adhesion.

Argon plasma micro-sandblasting is contemplated as a plasma treatment herein. Hydrogen plasma plasma treatment is also contemplated for removal of surface oxides on the recycled steel fibers. Helium, Nitrogen, and Oxygen plasma treatments are included within the scope of the invention.

Plasma CVD Surface Modification

Functionalized groups can be added to the cleaned surface of the recycled steel fibers using plasma enhanced chemical vapor deposition to coat the fibers with layers of carbon, silicon, carbon nanotubes, silicon carbide, silicon nitride, and so forth.

Plasma Wetting Layer

Improving wettability of the recycled steel fibers is also an aspect of plasma treatment included herein. Use of plasma treatment to modify the surface energy of the surface of the recycled steel fibers increases the mixability of the steel fibers in the composition. Examples of modifying the surface energy includes deposition of ultra-thin layers by plasma to adjust wetting properties, using siloxane-based or fluorocarbon films.

Composition Toughness

In select embodiments of the present invention, structures and components are built using a superior composition, providing a combination of high strength and superior energy absorbing capacity. Toughness is a measure of the amount of energy required to be expended to open cracks in the matrix under tensile loading. It is an important metric for objects that suffer impact.

Select embodiments of the present invention provide formulations and methods of fabrication for producing an optimum combination of increased strength and toughness in a custom composition that may be formulated with plasma treated recycled steel fibers.

Consistency Modifiers

Select embodiments of the present invention may incorporate high-performance materials such as woven mats of small diameter high-strength wire comprising steel or synthetics such as carbon fiber, fiberglass, and aramids, to further enhance performance. In select embodiments of the present invention, un-hydrated cement-based paste may be mixed in a "dough-like" consistency enabling it to be extrusion molded, spun-cast, or formed under external pressure into shapes suitable for protective applications, such as components for improving blast resistance of structures, for fabricating inexpensive alternatives to ceramic armor, and the like. This stiff mixture holds its shape during production and curing without the need of formwork, enabling it to be produced on an assembly line.

Because of superior performance, select embodiments of the present invention are suitable for commercial use as structural members and resistant panels. Select embodiments of the present invention obtain superior strength and toughness qualities through, among other considerations, proper selection of the type and quantity of constituents, including macro-, micro- and nano-sized inclusions of specified composition.

Macro- and microfiber reinforcement contributes to an optimum combination of strength and toughness. Macrofibers address bridging of macro-cracks and micro-fibers address bridging of micro-cracks.

Example—Specific Mixtures

Initial mixes of select embodiments of the present invention comprise: a cement of Blaine fineness at about 280 to about 360 m2/kg; sand at a mass ratio of about 0.75 to about 1.25 of the mass of cement; silica fume at a mass ratio of about 0.15 to about 0.4 of the mass of cement; silica flour at a mass ratio of about 0.15 to about 0.3 of the mass of cement; at least one high-range water-reducing admixture (HRWRA), such as GLENIUM® 3030 NS, Degussa Admixtures, Inc.; ADVA® 170 and ADVACAST® 500, W.R. Grace & Co., and PLASTOL, EUCON 37 and EUCON 1037, Euclid Chemical Co., in amounts approximately commensurate with the recommendations of the manufacturer; plasma treated recycled steel fibers.

Optional Additional Fibers

Optional additional fibers include mineral fibers (e.g., glass or asbestos), optional synthetic organic fibers (e.g., carbon, cellulose, or polymeric), optional natural organic fibers (e.g., sisal) at a mass ratio of up to about 0.35 of the mass of cement; and water at a mass ratio of about 0.2 to about 0.35 of the mass of cement.

In select embodiments of the present invention, an HRWRA may be added in specified amounts of about 3-20 fluid ounces per 100 lbs of the cement-based paste.

Example—Mix Variations

For select embodiments of the present composition, constituents may vary within the initial mix. For example, the cement may be portland cement of high-silica content, i.e., a calcium to silica ratio (Ca/Si) of less than about 3.1. Silica fume may be incorporated, of preferably at least 96% silica with a carbon content of less than about 4%. Silica flour may be incorporated, preferably as pure, finely crushed silica of less than about 40 microns. Macrofibers consist of plasma treated recycled steel fibers.

The composition may also contain optional synthetic fibers, polymer fibers, organic fibers, natural inorganic fibers, and the like, and combinations thereof.

Macrofiber Size

Preferably, macrofibers are provided in lengths between about 18 to about 38 mm (0.75-1.5 in.) and in diameters between about 0.38 to about 0.63 mm (0.015-0.025 in.). The ends of the macrofibers may be hooked, straight, or "bulbed." Special treatment of the macrofibers, such as bonding silica fume or glass frit to the surface or roughening the surface, enhances the bond between the cement-based paste and the macrofibers.

Mats comprising continuous, high-strength steel strands of diameter less than about 2.5 mm (0.1 in.) may be embedded in or bonded to the tensile-load carrying face of the mix to add strength and toughness. The high-range water-reducing admixture (HRWRA) may be a polycarboxylate type material, added in amounts approximating recommendations of the manufacturer.

Inclusions

In select embodiments of the present invention, microinclusions and nanoinclusions, also termed dispersions, are incorporated to increase the toughness of the mix (cement-based paste) at the micro (or nano) scale by acting as micro-crack bridging mechanisms that truncate or delay the growth of micro cracks in the mix and at the nanoscale by filling the void spaces between larger particles making the material more dense. Micro- and nanoinclusions may be selected from the group comprising: fiber-like microinclusions, spherical microinclusions, polyhedron microinclusions, fiber-like nanoinclusions, spherical nanoinclusions, polyhedron nanoinclusions, and the like, and combinations thereof. In select embodiments of the present invention, microinclusions may have a longest dimension from about one micron to about 150 microns.

Microinclusions may be selected from the group of materials comprising: metals, ceramics, organics, natural minerals, and the like, and combinations thereof. Specific configurations of these microinclusion and nanoinclusion materials may be selected from the group comprising: steel shavings, ceramic whiskers, ceramic spheres, mineral fibers, wollastonite, carbon fibers, carbon nanotubes, and the like, and combinations thereof. Further, nanoinclusions may be selected from the class of materials of a colloidal nature such as colloidal silica.

Flow Modifiers

In select embodiments of the present invention, the rheology of the constituents in the mix may range from highly flowable to that of stiff dough or clay, depending on the concentration of each of the constituents. The rheology of a particular mix is dependent on the volume and surface area of dry constituents (including the microinclusions and select nanoinclusions), the volume of water, and the mass of the HRWRA used. For example, a stiff dough-like mixture suitable for extruding or spin-casting contains a relatively high volume of dry constituents, a relatively low volume of water and a relatively moderate to low mass of an HRWRA. Conversely, a flowable mixture contains a relatively low volume of dry constituents, a relatively high volume of water and a relatively high mass of an HRWRA.

For mixing select embodiments of the present invention, equipment for making "stiff" mixtures comprises a shear-type mixer, such as a paddle or star-wheel mixer. These impart high-shear energy to the wetted constituents, readily converting them into a cement-based paste, albeit a stiff paste. The greater the shear-imparting energy imparted to the constituents in mixing, the quicker they form into a cement-based paste. For mixing select embodiments of the present invention, equipment for making "flowable" mixtures may be conventional drum-type mixers or the above high-shear mixers.

Example—Process

In select embodiments of the present invention, the process comprises loading dry constituents, including microinclusions and select nanoinclusions, such as microfibers and nanofibers, into the bowl of the mixer and first blending them in the dry state for about ten minutes. The HRWRA and water, and optionally, any colloidal nanoinclusions, are blended separately from the dry constituents and then added to the dry ingredients as the mixer is operating. Mixing continues to yield a homogeneous cement-based paste. In select embodiments of the present invention, the wet mixing may consume an hour depending on the amount of shear energy being imparted to the mixture and the volume of water and mass of the HRWRA added to wet the dry constituents. The mixture becomes a "homogenized" paste when no more individual particles are visible and the components in the mixer have come together as a single mass of cement-based paste having no separately distinguishable components. At this point, for select embodiments of the present invention, macrofibers may be added and blended for ten minutes to allow them to distribute evenly.

Molds and Forms

In select embodiments of the present invention, the cement-based paste is placed in molds to hydrate (harden). In select embodiments of the present invention, the molding procedure depends on the rheology of the final cement-based paste. Flowable cement-based pastes are placed or poured into molds that contain the cement-based paste until it hydrates.

In select embodiments of the present invention, fluid cement-based paste may be vibrated by placing molds filled with cement-based paste on an external vibrating table and vibrating the mold and cement-based paste as a unit, or by inserting internal vibrators into the cement-based paste and vibrating until it is consolidated. Vibration frees entrapped air voids from the cement-based paste and consolidates solid constituents into a tightly packed configuration.

In select embodiments of the present invention, "stiff" mixtures of the cement-based paste are shaped by pressure molding, extrusion molding, or spin casting. In select embodiments of the present invention, pressure molding comprises rolling or pressing a dough-like cement-based paste into a prepared mold or pressing a dough-like cement-based paste to a given thickness as in the case of making plates or tiles. In select embodiments of the present invention, placing a dough-like cement-based paste into an extruder and applying pressure to force it through the die yields a final molded shape. Extruded product may need to be supported until it hardens to prevent it from changing shape. In select embodiments of the present invention, spin casting involves placing a dough-like cement-based paste along the longitudinal axis of the inside of a mold and spinning the mold at high speed to distribute the cement-based paste evenly over the inside of the mold with the centrifugal force created by the spinning.

In select embodiments of the present invention, the molded, extruded or spun-cast cement-based paste is left in the mold or supported in the extruded or spun-cast shape until it has hydrated. This is normally 24 hours, but may be longer depending on the amount of the HRWRA specified for the formulation. In select embodiments of the present invention, product is not removed from the mold until it has achieved a stiffness that resists deformation under moderate force, such as thumb pressure.

Curing

In select embodiments of the present invention, curing may be done by conventional methods such as water curing or by applying a curing compound for the same length of time as conventional cement-based paste is cured. However, conventional curing methods may not yield an optimum combination of strength and toughness. To achieve a desired combination, in select embodiments of the present invention, the hydrated but not fully cured, cement-based paste is heated. In select embodiments of the present invention, prior to heating, the cement-based paste is cured for about seven days in an environment of approximately 100% relative humidity at ambient temperature, approximately 21° C.±3° C. (70° F.±5° F.), submersed in water at approximately 88° C.±3° C. (190° F.±5° F.) for about three to about five days, and heated in air at approximately 88° C.±3° C. (190° F.±5° F.) for about one to about two days. This process configures amorphous calcium silicate hydrate as a structure that is more like a crystalline structure than the original amorphous calcium silicate hydrate.

As shown, select embodiments of the present invention provide a composition that is both strong and tough for fabricating superior building components. These superior components may be made in any shape through form casting while conventional structural shapes may be made by either mold extrusion or spin-casting.

Commercial Uses

Select embodiments of the present invention are suitable for fabricating inexpensive structural panels, such as thin armor panels that may be used for vehicles as well as fixed structures. Structural armor panels may be formed or extruded to a thickness heretofore impractical because of the improved toughness and strength of embodiments of the present invention. For example, panels may be produced in size and thickness to accommodate man-portability. These man-portable panels may be configured for attaching to a structural framework to resist penetration of small arms fire and mitigate blast and fragmentation effects.

An embodiment of the present invention, configured appropriately, offers an inexpensive solution for force protection in addition to man-portable products. Applications for embodiments of the present invention include but are not limited to:

For the military and government applications: very high performance composition incorporated in inexpensive ballistic armor; light weight structural shapes such as plates, channels, pipes, tubes, I- and WF-sections; connectors; protective construction; blast-resistant panels; fragmenting munitions protection; vehicle up-armoring; forced entry resistant structural elements and the like.

For commercial users: building construction products, such as roofing tiles, wall panels, floor tiles, and the like; lightweight structural shapes such as plates, channels, pipes, tubes, I- and WF-sections; hurricane and tornado resistant structural elements, forced entry resistant structural elements, and the like.

Example—Plasma Cleaning of Recycled Steel Fibers

In a non-limiting example, steel fibers are obtained from recycled tires. Using plasma treatment to clean the steel fibers allows their use in the compositions claimed and described herein. Plasma cleaning the steel fibers avoids the use of environmentally unfriendly cleaning chemicals in addition to e.g. trichloroethylene. Plasma cleaning offers significant advantages over wet cleaning methods alone and removes organic contamination, renders surfaces more hydrophilic, and improves adhesion. In this example, the plasma treatment may include one or more of: Argon plasma micro-sandblasting; Hydrogen plasma treatment for removal of surface oxides on the recycled steel fibers; and/or Helium, Nitrogen, and Oxygen plasma treatments.

Example—Plasma CVD Surface Modification

In a non-limiting example, steel fibers are obtained from recycled tires. Using plasma treatment to clean the steel fibers allows their use in the compositions claimed and described herein. A second plasma treatment of the plasma cleaned steel fibers allows functionalized groups to be added to the cleaned surface of the recycled steel fibers using plasma enhanced chemical vapor deposition to coat the fibers with layers of carbon, silicon, carbon nanotubes, silicon carbide, silicon nitride, and so forth.

Example—Plasma Wetting Layer

In a non-limiting example, steel fibers are obtained from recycled tires. Using plasma treatment to clean the steel fibers allows their use in the compositions claimed and described herein. A second plasma treatment of the plasma cleaned steel fibers allows improvement of the wettability of the recycled steel fibers. Use of plasma treatment to modify the surface energy of the surface of the recycled steel fibers increases the mixability of the steel fibers in the composition. Examples of modifying the surface energy includes deposition of ultra-thin layers by plasma to adjust wetting properties, using siloxane-based or fluorocarbon films.

Example—Plasma Equipment

Plasma equipment is used to create a reactive plasma in a vacuum chamber. In order to generate plasma, a vacuum is required. Once the vacuum is in place, generally inside of an aluminum chamber, an RF signal is applied to excite the ions and create the plasma. In order to create plasma, the following equipment is necessary.

Vacuum Chamber

In order to reduce the pressure below 200 mTorr, a vacuum pump must be attached to the vacuum chamber to continuously evacuate the chamber and maintain a vacuum as gas is introduced to the chamber.

Vacuum Pump

A vacuum pump is required to maintain the vacuum in the vacuum chamber. The pump is generally connected to the chamber with a specialized hose or stainless steel piping. The pump may be controlled manually or automatically by the machine by either a relay or pass-through plug on the machine. All of our standard systems feature automatic vacuum pump control.

Radio Frequency (RF) Source

An RF source is applied to the chamber to excite the ions and create plasma. The RF is most commonly introduced at either 13.56 Mhz, or 50 Khz. The 13.56 Mhz, or high frequency, requires additional electronics and is generally used for etching applications. The 50 Khz RF is referred to as "low frequency" and is used for cleaning and surface modification.

Input Gas

An input gas, or a mixture of input gases, is introduced to the chamber before the RF power is supplied. The ions in the gas create the plasma and the gas is evacuated through the vacuum pump.

Electrical Requirements

Our PE-200 and larger systems require 220 v power at 15 amps or higher. Smaller plasma systems can be configured to run on either 110 v or 220 v AC power.

Example—Jersey Barrier

Referring now to FIG. 1, FIG. 1 is an illustration of a modified jersey barrier made using the compositions of the present invention.

FIG. 1 shows a jersey barrier that is Taller (850-900 mm) with a 40 mm wide lip overhanging 120-125 mm on the street side to prevent a heavy vehicle from launching itself at speed over the barrier. The lip meets the trunk section at a 110 degree angle, and the top surface and bottom surface of the jersey barrier are flat, and parallel to one another. The top surface in total is 270-280 mm, with the lip comprising 120-125 mm and the top section of the trunk being 150-155 mm (not including the lip). Steel rebars run from the hinge anchor on one end through the heart of the material to the other end thereby providing a positive connection between all of the sections linking them together. The footer is 75-90 mm thick and on one side meets the trunk at a 90 degree angle, while on the opposite (street) side, the footer meets the trunk at on offset angle of 135 degrees by having a sloped portion that is 120-140 mm in height. The rebar mounting posts 106 extending from the bottom surface of the footer extend 75-90 mm beyond the bottom surface of the footer. This jersey barrier has plasma treated recycled steel fiber reinforced UHPC with tensioning cables heat cured to 40,000 psi.

It is therefore to be understood that within the scope of the appended claims, the invention may be practiced otherwise than as described. Accordingly, all such modifications are intended to be included within the scope of this invention as defined in the following claims.

The invention claimed is:

1. A method of producing a component, comprising the steps:
   (i) cleaning recycled steel macrofibers,
   wherein said macrofibers are of lengths between about 18 to about 38 mm and in diameters between about 0.38 to about 0.63 mm,
   wherein the recycled steel macrofibers are cleaned by plasma treatment to remove organic contamination, remove surface oxides, increase surface hydrophilic property, and improve adhesion,
   wherein the plasma treatment is selected from the group consisting of: Argon plasma micro-sandblasting, Hydrogen plasma treatment for removal of surface oxides on the recycled steel fibers, Nitrogen plasma treatment, and Oxygen plasma treatment;
   (ii) surface-modifying the recycled steel macrofibers using plasma enhanced chemical vapor deposition to coat the recycled steel macrofibers with one or more layers selected from the group consisting of: carbon, carbon nanotubes, and mixtures thereof;
   (iii) surface energy modifying the recycled steel macrofibers using plasma treatment to have one or more ultra-thin layers of a film that adjusts wetting properties to improve of the wettability and increase the mixability of the macrofibers in a cement composition;
   (iv) mixing first constituents comprising:
   cement of Blaine fineness of about 280 to about 360 m2/kg;
   sand, wherein said sand is provided at a mass ratio of about 0.75 to about 1.25 of said cement;
   silica fume, wherein said silica fume is provided at a mass ratio of about 0.15 to about 0.4 of said cement;
   silica flour, wherein said silica flour is provided at a mass ratio of about 0.15 to about 0.3 of said cement;
   microinclusions, wherein said microinclusions are provided at a mass ratio of up to about 0.35 of said cement, and
   wherein said mixing results in a first homogeneous mix;
   (v) mixing second constituents comprising:
   at least one high-range water-reducing admixture; and water,
   wherein said water is provided at a mass ratio of about 0.2 to about 0.35 of said cement, and
   wherein said mixing of said second constituents results in a second homogenous mix;
   (vi) mixing said first homogeneous mix with said second homogeneous mix to form a uniform cement-containing paste;
   (vii) blending the recycled steel macrofibers into said uniform cement-containing paste,
   wherein said macrofibers are provided at a mass ratio of up to about 0.35 of said cement,
   wherein said recycled steel macrofibers are blended until distributed approximately uniformly in the resultant cement-containing paste;
   (viii) forming said resultant cement-containing paste in the shape of said component, wherein said forming is done by techniques selected from the group consisting of: spin casting, extrusion molding, pressure molding, pouring into forms, and combinations thereof; and
   (ix) curing said component by placing in an environment of approximately 100% relative humidity for about seven days at ambient temperature, then submersing in water of approximately 85° C. to about 91° C. for about three to about five days, and then heating in air at approximately 85° C. to about 91° C. for about one to about two days.

2. A jersey barrier, comprising:
a component made according to the process of claim 1,
wherein the dimensions of the component comprise a height of 850-900 mm with a 40 mm wide lip overhanging 120-125 mm on a street side, said lip joins a trunk section at a 110 degree angle, and a top surface and bottom surface of the component are flat, and parallel to one another, said top surface having an width of 270-280 mm, with said lip comprising 120-125 mm and a top remaining section of the trunk comprising 150-155 mm, said component having a footer 75-90 mm thick, said footer on one side meets the trunk at a 90 degree angle, and on the street side the footer meets the trunk at on offset angle of 135 degrees by having a sloped portion that is 120-140 mm in height, said component having a length from 850-4000 mm, and said component having a plurality of steel rebars forming a matrix that is disposed within an interior of the component, said matrix connected to rebar mounting posts extending from the bottom surface of the footer, said rebar mounting posts extend 75-90 mm beyond the bottom surface of the component, said component having a plurality of tensioning cables disposed within the interior of the component, said tensioning cables comprising heat cured cables cured to 40,000 psi.

3. The method of claim 1,
wherein said microinclusions have a longest dimension from about one micron to about 150 microns, and wherein said microinclusions are selected from the group consisting of: metals, alloys, steel, synthetics, polymers, natural inorganics, minerals, glass, asbestos, carbon, cellulose, synthetic organics, natural organics, sisal, and combinations thereof;
wherein said cement is portland cement with a calcium to silica ratio of less than about 3.1;
wherein said silica fume is at least 96% silica with a maximum carbon content of less than about 4%;
wherein said silica flour is crushed silica of less than about 40 microns in its longest dimension;
wherein said macrofibers incorporate ends selected from the group consisting of: hooked ends, approximately straight ends, bulbed ends, and combinations thereof;
wherein said macrofiber surface modification is selected from the group consisting of: silica fume bonded to said surface, glass frit bonded to said surface, a roughened surface, and combinations thereof;

wherein said high-range water-reducing admixture comprises polycarboxylates in the range of about three to about 20 fluid ounces per 100 lb of said resultant cement-containing paste.

4. The method of claim 1, comprising nanoinclusions mixed with said first constituents to yield said first homogeneous mix, wherein said nanoinclusions are selected from the group consisting of: carbon nanotubes, colloids, colloidal silica, and combinations thereof.

5. The method of claim 4 wherein configurations of said microinclusion materials are selected from the group consisting of: steel shavings, ceramic whiskers, ceramic spheres, mineral fibers, wollastonite, carbon fibers and combinations thereof.

6. A component made according to the process of claim 1.

7. The component of claim 6 wherein said component is selected from the group consisting of: a jersey barrier, a support plate, a channel, a pipe, a tube, an I-section, an WF-section, a connector, a panel, a vehicle up-armoring component, a ballistic armor plate, a blast-resistant panel, a man-portable panel, a thin armor panel, a forced entry resistant structural element, a roofing tile, a wall panel, a floor tile, a hurricane and tornado resistant structural element, and combinations thereof.

8. The component of claim 6, comprising mats of steel strands of diameter less than about 2.5 mm affixed to a tensile-load carrying face of said component.

* * * * *